US008807070B2

(12) United States Patent  
Jensen

(10) Patent No.: US 8,807,070 B2  
(45) Date of Patent: Aug. 19, 2014

(54) ROTOR PROCESSOR FOR DRY POWDERS

(75) Inventor: Brian K. Jensen, Cedar Rapids, IA (US)

(73) Assignee: Vector Corporation, Marion, IA (US)

( * ) Notice: Subject to any disclaimer, the term of this patent is extended or adjusted under 35 U.S.C. 154(b) by 948 days.

(21) Appl. No.: 12/509,513

(22) Filed: Jul. 27, 2009

(65) Prior Publication Data

US 2010/0031881 A1    Feb. 11, 2010

Related U.S. Application Data

(60) Provisional application No. 61/087,083, filed on Aug. 7, 2008, provisional application No. 61/087,089, filed on Aug. 7, 2008.

(51) Int. Cl.

| | | |
|---|---|---|
| *B05B 17/00* | (2006.01) | |
| *B01J 2/00* | (2006.01) | |
| *B01J 2/14* | (2006.01) | |
| *B01J 2/16* | (2006.01) | |
| *B01J 8/38* | (2006.01) | |
| *B01F 13/10* | (2006.01) | |

(52) U.S. Cl.
CPC .. *B01J 2/006* (2013.01); *B01J 2/14* (2013.01); *B01J 2/16* (2013.01); *B01J 8/386* (2013.01); *B01F 2013/1094* (2013.01)
USPC ............................. 118/303; 118/313; 366/102

(58) Field of Classification Search
CPC ................ B01J 2/006; B01J 2/16; B01J 2/14; B01J 8/386; B01F 2013/1094
USPC ......................... 118/303, 313, 314, 315, 316; 366/163.2, 101, 102
See application file for complete search history.

(56) References Cited

U.S. PATENT DOCUMENTS

| | | | | |
|---|---|---|---|---|
| 3,711,319 A | | 1/1973 | Irikura et al. | |
| 3,913,847 A | * | 10/1975 | Glatt et al. | 241/46.04 |
| 4,034,126 A | | 7/1977 | Funakoshi et al. | |
| 4,237,814 A | * | 12/1980 | Ormos et al. | 118/303 |
| 4,323,312 A | * | 4/1982 | Glatt et al. | 366/102 |
| 4,535,006 A | * | 8/1985 | Naunapper et al. | 118/688 |
| 4,542,043 A | * | 9/1985 | Abe et al. | 427/213 |
| 4,556,175 A | * | 12/1985 | Motoyama et al. | 241/57 |
| 4,576,108 A | * | 3/1986 | Socola et al. | 118/19 |
| 4,588,366 A | * | 5/1986 | Glatt | 425/222 |
| 4,623,098 A | * | 11/1986 | Motoyama et al. | 366/102 |
| RE32,307 E | * | 12/1986 | Glatt et al. | 366/102 |
| 4,740,390 A | * | 4/1988 | Kulling | 427/213 |
| 4,772,193 A | * | 9/1988 | Glatt | 34/369 |
| 4,826,325 A | * | 5/1989 | Iwata et al. | 366/221 |
| 4,834,299 A | * | 5/1989 | Kishibata et al. | 241/5 |
| 4,895,733 A | * | 1/1990 | Imanidis et al. | 427/8 |
| 4,967,688 A | * | 11/1990 | Funakoshi et al. | 118/303 |

(Continued)

*Primary Examiner* — Tony G Soohoo
(74) *Attorney, Agent, or Firm* — McKee, Voorhees & Sease

(57) ABSTRACT

The improved rotor processor of the present invention includes a stator with a rotatable rotor defining a rotor chamber in which particles are circulated for coating or layering. A spray gun mounted to the stator adjacent the rotor directs liquid into the rotor chamber, while a powder feed system mounted in the stator adjacent the rotor directs dry powder into the rotor chamber. The spray gun and powder feed system are spaced apart circumferentially so as to define a spray zone and a separate powder zone through which the circulating particles repeatedly and sequentially pass. The powder feed system includes a feed screw conveyor, an eductor, and a flexible conduit for delivering micronized powders, such as polymers or glidants, to the rotor chamber.

18 Claims, 4 Drawing Sheets

(56) References Cited

U.S. PATENT DOCUMENTS

| | | | | |
|---|---|---|---|---|
| 5,018,671 | A | * | 5/1991 | Tanimoto et al. ............... 241/16 |
| 5,030,400 | A | * | 7/1991 | Danielsen et al. ............ 118/303 |
| 5,040,310 | A | * | 8/1991 | Huttlin ........................... 34/587 |
| 5,132,142 | A | * | 7/1992 | Jones et al. ................... 427/196 |
| 5,229,135 | A | | 7/1993 | Philippon et al. |
| 5,284,678 | A | * | 2/1994 | Hirschfeld et al. ........... 427/212 |
| 5,296,265 | A | * | 3/1994 | Okuma et al. ................ 427/213 |
| 5,344,619 | A | * | 9/1994 | Larwick et al. ............... 422/261 |
| 5,350,567 | A | * | 9/1994 | Takeda et al. ................. 422/111 |
| 5,399,186 | A | | 3/1995 | Derrah et al. |
| 5,429,825 | A | * | 7/1995 | Reo et al. ...................... 424/490 |
| 5,507,871 | A | * | 4/1996 | Morino et al. ................ 118/680 |
| 5,580,580 | A | | 12/1996 | Masterson et al. |
| 5,582,643 | A | * | 12/1996 | Takei et al. ................... 118/303 |
| 5,703,156 | A | | 12/1997 | Sauer |
| 5,720,439 | A | * | 2/1998 | Nakazawa et al. ............. 241/21 |
| 5,792,507 | A | | 8/1998 | Kato et al. |
| 5,904,951 | A | * | 5/1999 | Yamanaka et al. ........... 427/2.14 |
| 6,042,033 | A | * | 3/2000 | Sugimoto et al. .......... 241/46.02 |
| 6,066,339 | A | | 5/2000 | Stark et al. |
| 6,136,345 | A | | 10/2000 | Grimmett et al. |
| 6,187,379 | B1 | * | 2/2001 | Lackey ...................... 427/248.1 |
| 6,264,989 | B1 | * | 7/2001 | Kato et al. ..................... 424/490 |
| 6,270,801 | B1 | * | 8/2001 | Walter .......................... 424/489 |
| 6,410,087 | B1 | | 6/2002 | Wilde et al. |
| 6,695,989 | B1 | * | 2/2004 | Tsujimoto .......................... 264/7 |
| 6,745,960 | B1 | | 6/2004 | Myo et al. |
| 7,070,806 | B2 | | 7/2006 | Oshlack et al. |
| 7,323,195 | B2 | | 1/2008 | Rozhon et al. |
| 7,387,793 | B2 | | 6/2008 | Venkatesh et al. |
| 7,431,944 | B2 | | 10/2008 | Mehta et al. |
| 7,488,497 | B2 | | 2/2009 | Depui et al. |
| 7,614,359 | B2 | * | 11/2009 | Hasegawa et al. ............. 118/13 |
| 7,699,255 | B2 | * | 4/2010 | Kapper ...................... 241/261.2 |
| 7,726,591 | B2 | * | 6/2010 | Basten ............................... 241/5 |
| 7,753,298 | B2 | * | 7/2010 | Basten ............................. 241/62 |
| 7,802,376 | B2 | * | 9/2010 | Huttlin .............................. 34/90 |
| 2005/0053651 | A1 | | 3/2005 | Knapp et al. |
| 2006/0073203 | A1 | | 4/2006 | Ljusberg-Wahren et al. |
| 2007/0175472 | A1 | | 8/2007 | Pipkin et al. |
| 2007/0196502 | A1 | | 8/2007 | Mort, III et al. |
| 2007/0207207 | A1 | | 9/2007 | Tzannis et al. |
| 2008/0166404 | A1 | | 7/2008 | Tzannis et al. |
| 2008/0181050 | A1 | * | 7/2008 | Basten ........................... 366/102 |
| 2010/0031881 | A1 | * | 2/2010 | Jensen ........................... 118/300 |

* cited by examiner
ROTOR PROCESSOR FOR DRY POWDERS

CROSS-REFERENCE TO RELATED APPLICATIONS

This application claims priority under 35 U.S.C. §119 of provisional application Ser. Nos. 61/087,083 filed Aug. 7, 2008 and 61/087,089 filed Aug. 7, 2008, which applications are hereby incorporated by reference in their entirety.

FIELD OF THE INVENTION

The invention is directed towards a rotor processor for coating or layering micronized particles with a polymer in a rotor processor. An improvement to the processor is directed to a powder feed system for introducing dry polymers and dry glidants into the rotor chamber and onto the circulating particles.

BACKGROUND OF THE INVENTION

Coating of small particulates, commonly known as cores, beads, crystals, pellets, granules or seeds, is well known for creating spherical particles, such as pharmaceuticals. The typical size for such particles is 50-10,000 microns. The coating material is normally a polymer, which may be a copolymer or monomer. A rotor processor is commonly used for such coating. This processor has a cylindrical stator chamber with a rotatable disc mounted therein, and a narrow annular slit between the inner wall of the stator and the perimeter edge of the rotor. The rotor forms a floor in the chamber upon which particles are supported. The width of the slit is sufficiently narrow so as to prevent particles in the chamber from falling through the slit. Rotation of the rotor imparts centrifugal force to the particles, which are thrown to the wall of the stator, wherein air forced upwardly through the slit lifts the particles upwardly. The width of the slit governs the air velocity for a given air flow, which creates an upward draft which carries the particles upwardly. The upward movement of the particles continues, as long as the air velocity exceeds the transport velocity required to fluidize the particles. The air passing through the slit has a relatively high velocity, and then expands into the larger volume of the chamber, thereby losing velocity. As the particles lose their transport velocity, they fall back toward the center of the rotor and return to the rotor surface. Thus, the rotating rotor and the upwardly flowing air create a circulating bed of particles within the chamber.

The particles are coated or layered during circulation through the bed. In the conventional layering process, a polymer, copolymer or monomer is dissolved in a solvent, which is then sprayed onto the particles in the chamber while the particles are circulating. The airflow also functions to dry the solution on the cores, with the layer thickness being built up as the particles continue circulating through the bed for repeated exposure to the sprayed solution.

Some polymers have an adhesive nature. In prior art coating processes, these polymers generally are diluted to 2-15% solids content to minimize agglomeration due to the adhesive nature. Furthermore, glidants are normally suspended in the polymer spray solution/dispersion so as to prevent or inhibit agglomeration during the coating process. Examples of glidants include titanium dioxide, calcium carbonate, magnesium stearate or any metal stearate, fumed or colloidal silica, sodium lauryl sulfate, graphite or any other finely divided material capable of reducing the adhesive nature of some polymers. Such glidants normally must be added to the polymer spray solution/dispersion in concentrations of 5-100%, based on the polymer solids in the solution/dispersion. These suspensions must be continuously agitated to prevent settling. The glidants in solution/dispersion often cause buildup in the spray guns, and thus blockage during processing, as well as problems with settlement in the solution/dispersion lines and other flow problems leading to inconsistent delivery during the coating process.

With the conventional polymer layering process, the polymers must be soluble so as to dissolve in a suitable solvent so as to be applied as a dilute liquid. Typical soluble polymers will be 5-15% solids in solution, by weight. In a pharmaceutical application, the polymers may function for modified release of active ingredients and/or for taste masking. In this type of application, polymers may be layered on the cores for 5-25% weight gain. In the case of organic solvent soluble polymers, as much as 5 kg of solvent must be used for each 1 kg of product coated. In scaled production, this is a very large amount of solvent per coated batch. For example, in a 5 kg batch of cores coated to a 25% weight gain with a 5% solids solution, a 25 kg solution is required, with the polymer application being approximately 2.5 grams of polymer substances per minute. Thus, the conventional layering process with dissolved polymers in solvent solution is slow and requires large volumes of solvents.

In the conventional rotor processors, such as the GX or GXR sold by Applicant, the expansion chamber of the processor is normally maintained at a slightly negative pressure. Pulse filters are provided at the top of the processor and are connected to a positive compressed air source. The product powder port is located above the rotor chamber to drop powder downwardly by gravity and/or pulled into the processor by the negative internal pressure onto the circulating particles. The powder port is an opening without a closure or seal. Occasionally, the filter pressure may exceed the chamber pressure, in which case the powders are forced out of the open powder port. Some powders are toxic, which presents a hazardous situation. Also, the loss of powder from the processor is a wasteful cost.

Accordingly, a primary objective of the present invention is the provision of an improved rotor processor for supplying dry powder polymers or glidants to the particle bed in the rotor chamber.

Another objective of the present invention is the provision of an improved powder feed system for a rotor processor which introduces dry powders into the rotor chamber for application to particles in the circulating bed.

A further objective of the present invention is the provision of an improved rotor processor having a powder feed system with a precise screw conveyor, and eductor, and a ball mounted powder conduit.

Still another objective of the present invention is the provision of an improved rotor processor wherein dry powders are introduced into the rotor chamber at a level circumferentially spaced from the liquid spray gun of the rotor chamber.

Yet another objective of the present invention is the provision of an improved rotor processor having separate spray and powder zones in the rotor processor through which circulating particles sequentially and repeatedly pass.

A further objective of the present invention is the provision of an improved rotor processor for dry powders which introduces the powders into the rotor chamber under a positive pressure.

Another objective of the present invention is the provision of an improved rotor processor for application of dry powders to the circulating particle bed which is effective and efficient.

These and other objectives will become apparent from the following description of the invention.

BRIEF SUMMARY OF THE INVENTION

The rotor processor of the present invention includes a stator and a rotor rotatably mounted in the stator to define a rotor chamber. A gap between the peripheral edge of the rotor and the interior cylindrical wall of the stator allows air to flow upwardly during the operation of the processor to facilitate circulation of the particles within the rotor chamber. A spray gun extends through the stator wall and into the rotor chamber to spray a liquid onto the bed of particles. A dry powder feed system extends through the stator wall and into the rotor chamber to direct dry powder into the bed of particles. The spray gun and the powder feed system define separate spray and powder zones within the circulating bed of particles, which pass repeatedly and sequentially through the zones to build a coating or layering onto the particles. The powder is introduced under positive air pressure. Depending on the coating process, the powder may be a dry polymer or a dry glidant.

DETAILED DESCRIPTION OF THE PREFERRED EMBODIMENT

Figure 1:
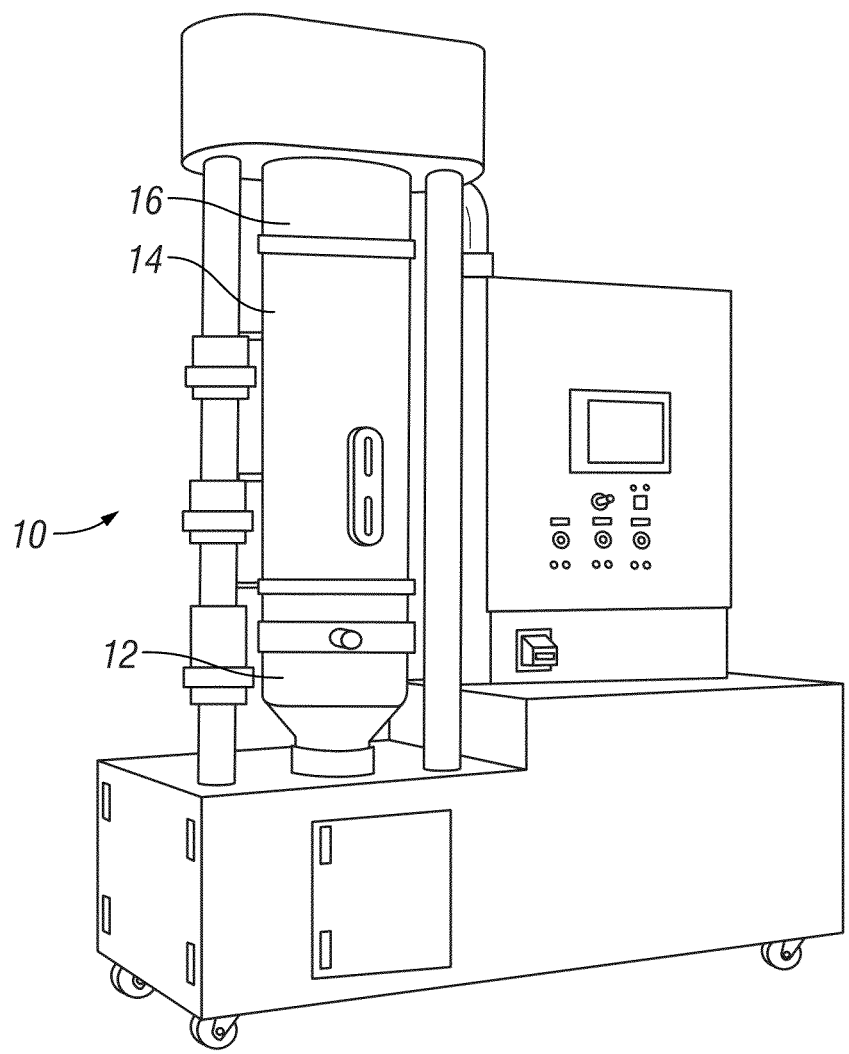
FIG. 1 is a perspective view of the improved rotor processor of the present invention, but without the powder feed system connected.

The rotor processor of the present invention is generally designated by the reference numeral 10 in the drawings. The processor includes a lower portion defining a rotor chamber 12, a central portion defining an expansion chamber 14, and an upper portion 16 housing the pulse filter. The expansion chamber 14 and pulse chamber filter 16 are conventional.

The present invention is directed towards the rotor chamber 12, which is defined by a substantially cylindrical stator 18 having a concave or dish-shaped rotor 20. The internal wall of the stator 18 has a ledge 22. The perimeter edge of the rotor 20 extends over the upper surface of the ledge 22, and when the rotor processor 10 is operating, the rotor 20 lifts off of the ledge 22 to define a small gap through which air flows upwardly. This gap structure and function is disclosed in Applicant's co-pending application Ser. No. 11/669,544 filed Jan. 31, 2007 and entitled ROTOR PROCESSOR.

The rotor 20 is mounted on a shaft 24 which is drivingly connected to a motor 26 via gears and a drive belt (not shown).

Figure 2:
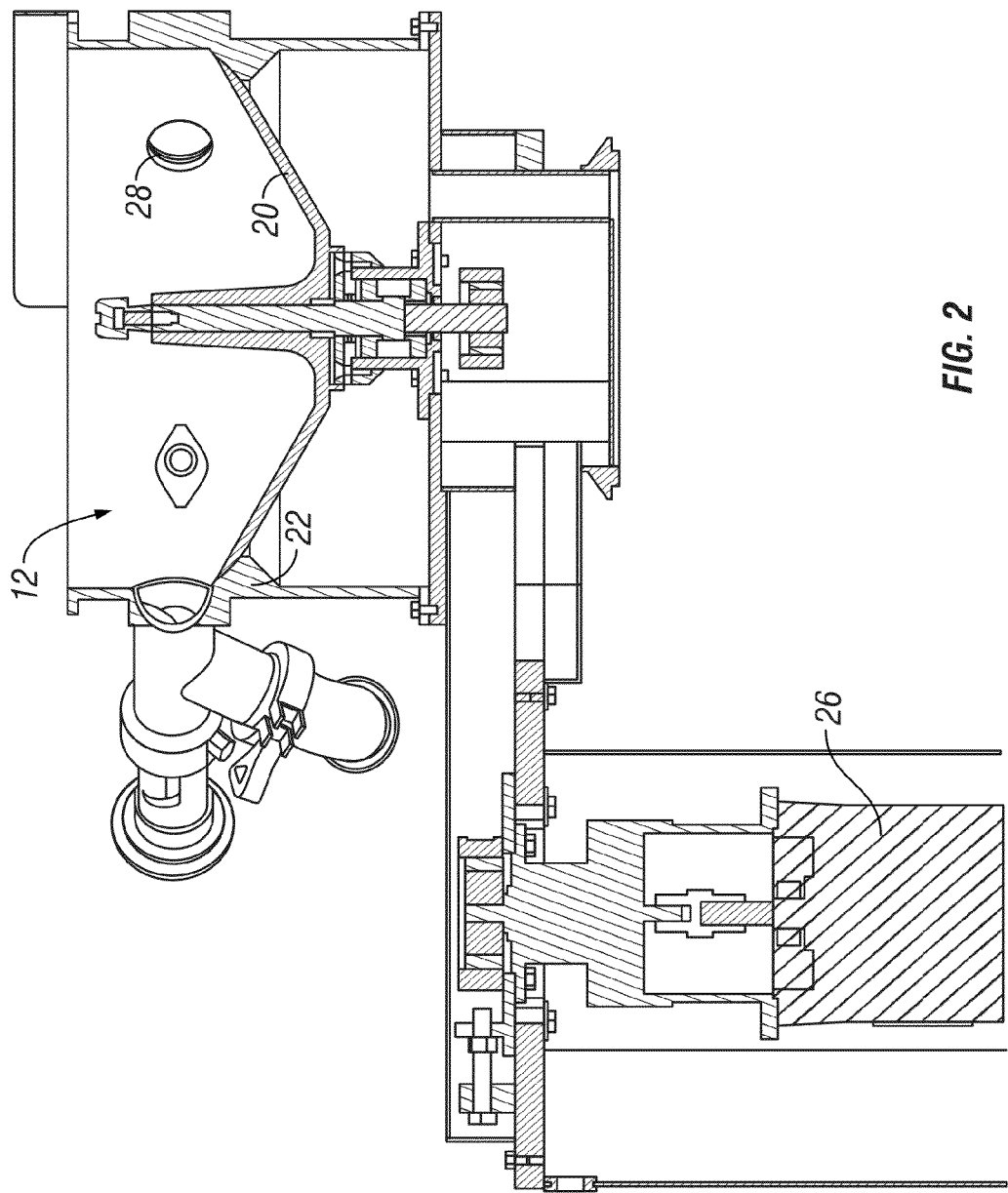
FIG. 2 is a sectional view showing the rotor chamber of the processor in a non-operating condition.
Figure 3:
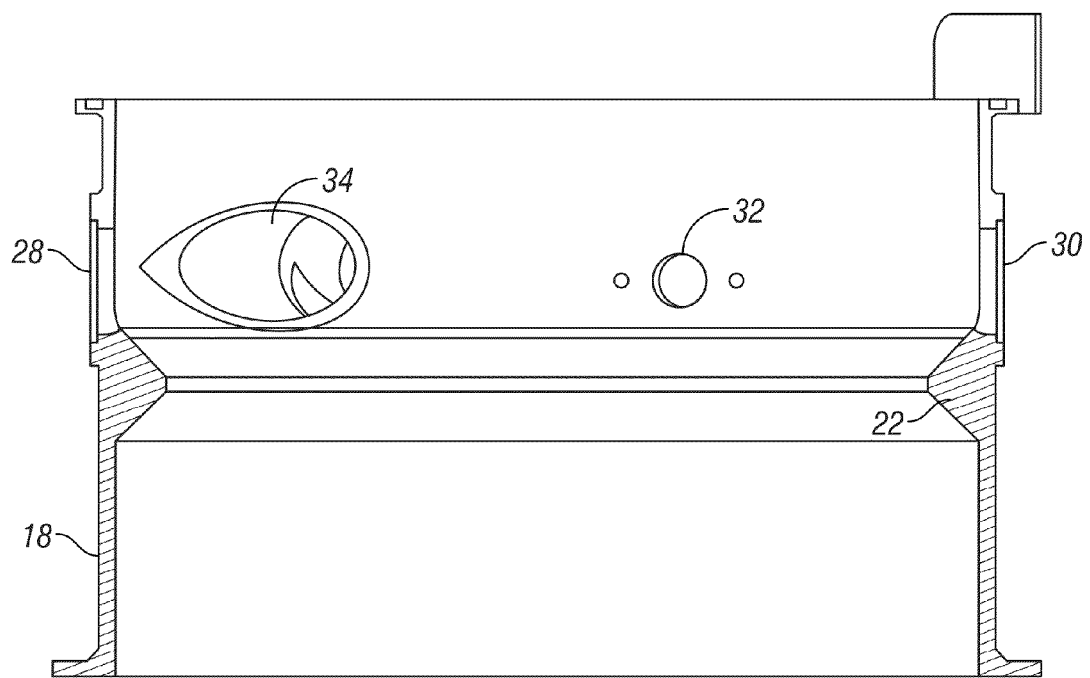
FIG. 3 is a sectional view of the stator wall with the powder and spray ports on opposite sides of the wall.
Figure 4:
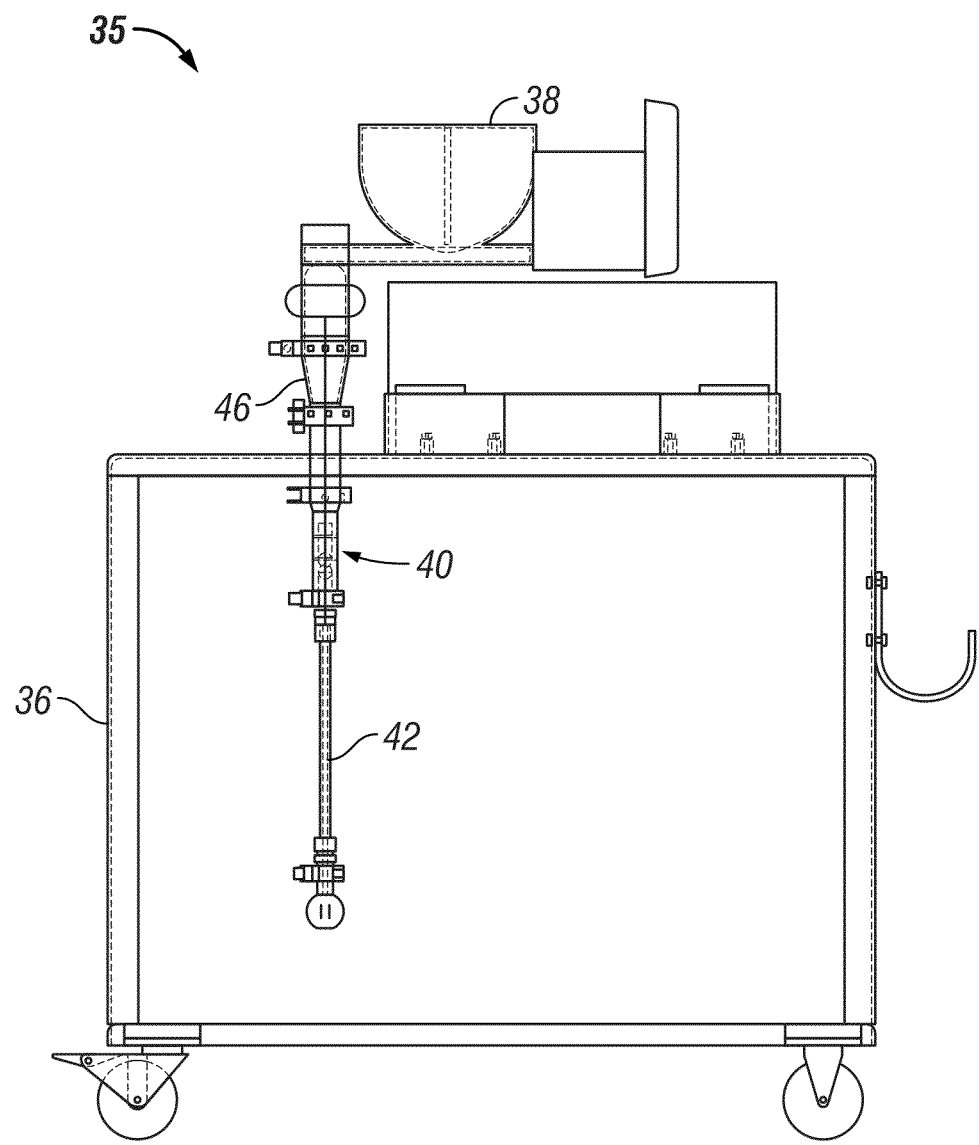
FIG. 4 is a view of the powder feeder system of the present invention which connects to the processor of FIG. 1.

The stator 18 and rotor 20 may be in the form of an insert which can be removably clamped beneath the expansion chamber 14. The stator 18 includes a spray gun port 28, a powder port 30, a sample port 32, and a discharge port 34. Depending upon the size of the processor 10, multiple spray gun ports 28 and powder ports 30 may be provided. The powder port 30 is spaced circumferentially from the spray port 28, but generally at the same elevation relative to the rotor chamber 12. As best seen in FIG. 2, the spray gun port 28, and thus the powder port 30, is positioned adjacent or slightly above the upper perimeter edge of the rotor 20. The sample port 32 allows product samples to be removed for inspection during operation of the processor. The discharge port 34 allows finished product to be removed from the processor 10.

A spray gun is attached to the spray gun port 28 in any convenient manner, such as with a ball mount or universal joint connector. Similarly, a powder feed system 35 is attached to the powder port 30 with a ball mount or universal joint connector. The powder feed system 35 is mounted on a cart 36 for quick and easy connection and disconnection to the processor 10. The system 35 includes three principle components, a powder feed conveyor 38, an eductor 40, and a flexible Teflon® or stainless steel conduit 42 extending from the eductor 40 to the ball mount. A reducer 46 is located between the conveyor 38 and the educator 40. The feed conveyor 38 precisely transfers the powder from a container (not shown) to the eductor 40. One example of a conveyor 38 is the KT20 K-Tron screw conveyor sold by Applicant. The eductor 40 is connected to a source of pressurized air so that the powder is transmitted from the eductor 40, through the conduit 42 and pushed into the rotor chamber 14 under a positive pressure. Preferably, the pressure ranges between 10-100 psi. The feed rate of the conveyor 38 preferably is in the range of 1-20 grams/minute, +/−0.5 grams/minute, depending upon the size of the processor 10.

The spaced apart spray port 28 and powder port 30 effectively define separately spray and powder zones within the rotor chamber 12 through which particles sequentially and repeatedly pass when the processor 10 is operating. More particularly, when the motor 26 is actuated to rotate the rotor 20, the centrifugal force of the rotor 20 is imparted to particles sitting on the rotor, which defines a floor for the chamber 12. The particles are thrown outwardly towards the wall of the stator 18, wherein the air flowing upwardly through the gap creates an upward draft that carries the particles upwardly, until the transport velocity required to lift the particles exceeds the air velocity of the upward draft. As the air leaves the confines of the gap, it expands into the larger volume of the chamber 12, thereby losing its high initial velocity, such that the particles lose transport velocity and fall back toward the center of the rotor 12 onto the rotor surface. The air velocity at the slit or gap must exceed the transport velocity of the particles at all times during operation of the processor 10, in order to prevent particles from falling downwardly through the gap. As the particles circulate in the rotor chamber 12, they are coated by liquid from the spray gun and dry powder from the powder feed system 35 until a desired layer thickness is achieved. Additional drying air is introduced into the processor from above the bed, to further enhance evaporation. The delivery of a large amount of drying air from the top of the particle bed allows for rapid evaporation of the coating solution, while keeping the cores in contact with the rotor plate and maintaining the small gap between the rotor and the stator.

The improved rotor processor 10 of the present invention can be used with dry polymer powders or dry glidant powders. Applicant's co-pending application Ser. No. 12/512,387 filed Jul. 30, 2009, describes a dry glidant process. This application is incorporated herein by reference.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved rotor processor for coating particles, the processor having an expansion chamber, a stator mounted on the expansion chamber, a rotor mounted on the stator to define a rotor chamber, the stator being removable from the expansion chamber such that particles to be coated are loadable onto the rotor whereafter the stator is reattached to the expansion chamber, a gap between a peripheral edge of the rotor and an interior cylindrical surface of the stator through which air flows upwardly during operation of the processor so as to create a circulating bed of the particles in the rotor chamber, and a spray gun extending through a wall of the stator adjacent the rotor to spray a liquid coating material onto the circulating bed of particles, the improvement comprising:

a powder feed system connected to the wall of the stator adjacent the rotor to direct powdered coating material into the rotor chamber and onto the circulating bed of particles;

the powdered coating material being a different material than the particles being coated; and the powder feed system being spaced circumferentially apart from the spray gun on the stator wall, so as to define spaced apart liquid and powder coating zones through which the particles pass for coating with the liquid and powdered coating materials.

2. The improved rotor processor of claim 1 wherein the powder feed system includes an eductor to transmit the powdered coating material to the rotor chamber under positive air pressure.

3. The improved rotor processor of claim 2 wherein the eductor is connected to an air source to provide positive air pressure for introducing the powdered coating material into the bed of particles.

4. The improved rotor processor of claim 3 wherein the air pressure is 10-100 psi.

5. The improved rotor processor of claim 2 wherein the eductor has an inlet connected to a powder screw conveyor and an outlet connected to a conduit connected to the stator wall.

6. The improved rotor processor of claim 5 wherein the screw conveyor has a powder feed rate of 1-20 grams/minute, +/−0.5 g/min.

7. The improved rotor processor of claim 1 wherein the stator wall includes a powder port to which the powder feed system is detachably connected and a spray port to which the spray gun is detachably connected.

8. The improved rotor processor of claim 1 wherein the spray gun and powder feed system operate simultaneously during coating of the particles.

9. An improved rotor processor for coating particles, comprising:

an expansion chamber;

a stator having a cylindrical wall and being moveable relative to the expansion chamber between a loading position to load particles and a processing position to coat the particles;

a rotatable rotor mounted within the stator and having a perimeter edge spaced adjacent the stator wall so as to define a rotor chamber above the rotor;

a spray gun mounted to the stator adjacent the rotor for directing a liquid coating material into the rotor chamber; and a powder feed system mounted to the stator for directing powder coating material into the rotor chamber;

the spray gun and powder feed system define spaced apart spray and powder coating zones through which particles sequentially and repeatedly circulate during operation of the processor so as to coat the particles with the liquid and the powder coating materials; and the powdered coating material being distinct from the particles being coated.

10. The improved rotor processor of claim 9 wherein the powder feed system includes a powder conduit connected to the stator wall, an eductor connected to the conduit, and a powder feed conveyor connected to the eductor.

11. The improved rotor processor of claim 9 further comprising a pressurized air supply connected to the powder coating material feed system to direct powder into the rotor chamber under positive pressure.

12. The improved rotor processor of claim 11 wherein the air supply operates at 10-100 psi.

13. The improved rotor processor of claim 9 wherein the powder feed system supplies the powder coating material to the rotor chamber at a rate of 0.5-20.5 grams/minute.

14. The improved rotor processor of claim 9 wherein the powder feed system and spray gun operate simultaneously.

15. The improved rotor processor of claim 9 wherein the powder feed system and spray gun are spaced circumferentially on the stator wall.

16. The improved rotor processor of claim 9 wherein the stator has spaced apart ports to which the spray gun and powder feed systems are removably attached.

17. An improved batch rotor processor for coating particles having an expansion chamber and a stator with a rotor mounted therein to define a rotor chamber, the stator being movable relative to the expansion chamber such that a batch of particles to be coated are loadable onto the rotor, a gap between a peripheral edge of the rotor and an interior cylindrical surface of the stator through which air flows upwardly during operation of the processor so as to create a circulating bed of particles in the rotor chamber, and a spray gun extending through a wall of the stator adjacent the rotor to spray a liquid onto the circulating bed of particles, the improvement comprising:

a means for introducing powder coating material into the rotor chamber and onto the circulating bed of particles; and separate spray and powder coating zones in the rotor chamber wherein the particles are coated alternately with the liquid and powdered coating materials.

18. The improved rotor processor of claim 17 wherein the powder feed system and the spray gun are spaced apart on the stator.

\* \* \* \* \*